United States Patent [19]

Mackinder

[11] 4,102,592
[45] Jul. 25, 1978

[54] MULTIPLE SPINDLE INCLINED DRILLING MACHINE

[75] Inventor: Harold C. Mackinder, Livonia, Mich.

[73] Assignee: Lincoln Park Engineering, Inc., Romulus, Mich.

[21] Appl. No.: 822,080

[22] Filed: Aug. 5, 1977

[51] Int. Cl.² ............................................. B23B 39/18
[52] U.S. Cl. ....................................... 408/46; 408/48; 408/52; 408/53; 408/234
[58] Field of Search ........................ 408/42, 46, 47, 48, 408/50–53, 130, 234

[56] References Cited

U.S. PATENT DOCUMENTS

| 2,795,978 | 6/1957 | Kinsey | 408/67 |
| 2,963,725 | 12/1960 | Bredtschneider | 408/67 |
| 3,452,792 | 7/1969 | Foreman | 408/50 |

FOREIGN PATENT DOCUMENTS 942,040  11/1963  United Kingdom ................. 408/48

Primary Examiner—Leonidas Vlachos
Attorney, Agent, or Firm—Cullen, Settle, Sloman & Cantor

[57] ABSTRACT

A multiple spindle inclined drilling machine includes a base having a bed inclined at an acute angle and with guideways upon said bed. A slide is reciprocally mounted upon said ways and is connected to a piston rod of a cylinder assembly mounted upon said base for effecting reciprocal movements thereof. A multiple spindle head is mounted upon said slide. An apertured fixture adapter is mounted upon said bed and lies in a plane at right angles thereto. A rotative drive mechanism is mounted upon said bed and has a variable speed output shaft. A plurality of drive spindles with individually mounted drills is adjustably supported upon and within said head and connected to said drive mechanism. An upwardly and rearwardly inclined fixture mounting plate spans and is secured to said adapter for supporting a workpiece mounting fixture. A series of variably located drill guide bushings are nested within said fixture and arranged in a predetermined pattern for receiving the drills upon the plurality of prelocated spindles.

14 Claims, 3 Drawing Figures

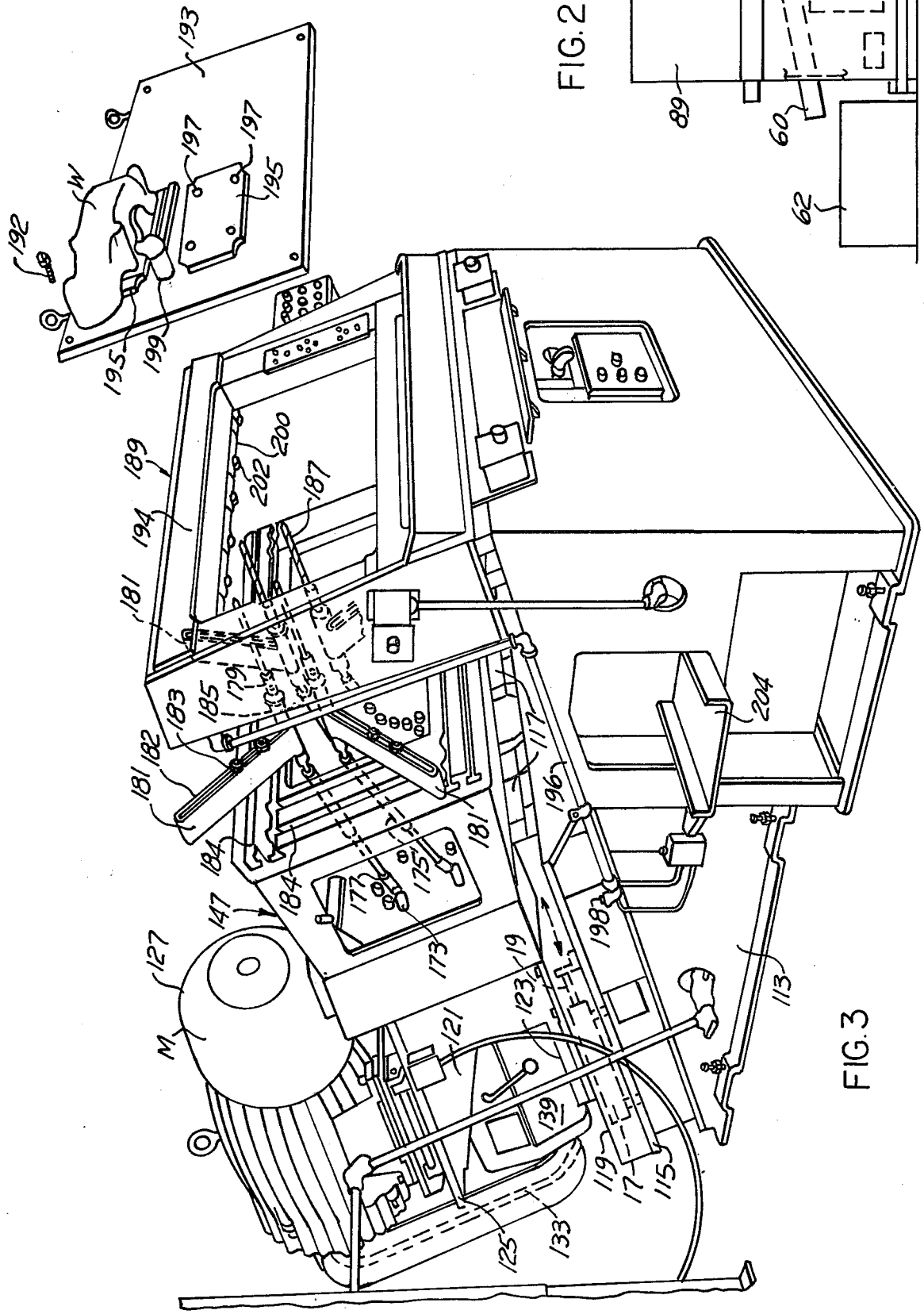

MULTIPLE SPINDLE INCLINED DRILLING MACHINE

BACKGROUND OF THE INVENTION

Heretofore, using conventional vertical drilling methods, a horizontally disposed fixture was mounted upon the bed of the drilling machine and supported thereover a workpiece held down by suitable clamps. The variably located bushing support arms and spindles for the drills were guidably projected through a horizontally disposed bushing plate supporting a series of prelocated bushings for drilling down into the workpiece. In many situations, before drilling, the fixture supporting the workpiece was first rotated 180° so that the workpiece was drilled from the rear thereof. With vertical drilling, the chips tended to accumulate on the workpiece and within the holes being drilled, resulting in increased drilling time, overheating and a short tool life.

SUMMARY OF THE INVENTION

In accordance with the present invention, there is provided upon the base of a multiple spindle drilling machine, an upwardly inclined bed arranged at an acute angle in the range of 20° to 40°. The multiple spindle head is mounted upon a slide which is reciprocally mounted upon ways upon said bed inclined at a correspondingly acute angle for moving the multiple spindle head and its series of variably located spindles and tools in an angularly upward direction with respect to an apertured fixture adapter. The fixture adapter receives upon its exterior face a fixture-mounting plate supporting one or more fixtures upon the exterior thereof to which a workpiece or a plurality of workpieces are clamped.

By this construction and drilling at an upward angle, there is a free-falling chip removal with the result of greater tool life and better loading conditions. It takes less time to load a workpiece upon the exterior of a fixture. By this arrangement, there is less drilling time, higher speeds of feeding with less expensive fixturing and tooling.

By the arrangement which includes the mounting of the workpiece upon the exterior of the upwardly and rearwardly inclined fixture, it takes less time to set up the adjustable bushing arms for the spindle assemblies and greater accuracy in hole location prior to the drilling step.

These and other objects will be seen from the following specification and claims in conjunction with the appended drawings in which:

THE DRAWINGS

FIG. 2 is an end view thereof.

FIG. 3 is a side perspective view of a 18 inches × 48 inches, 45 spindle heavy-duty multiple spindle inclined drilling machine with the fixture mounting plate shown in exploded view.

Figure 1:
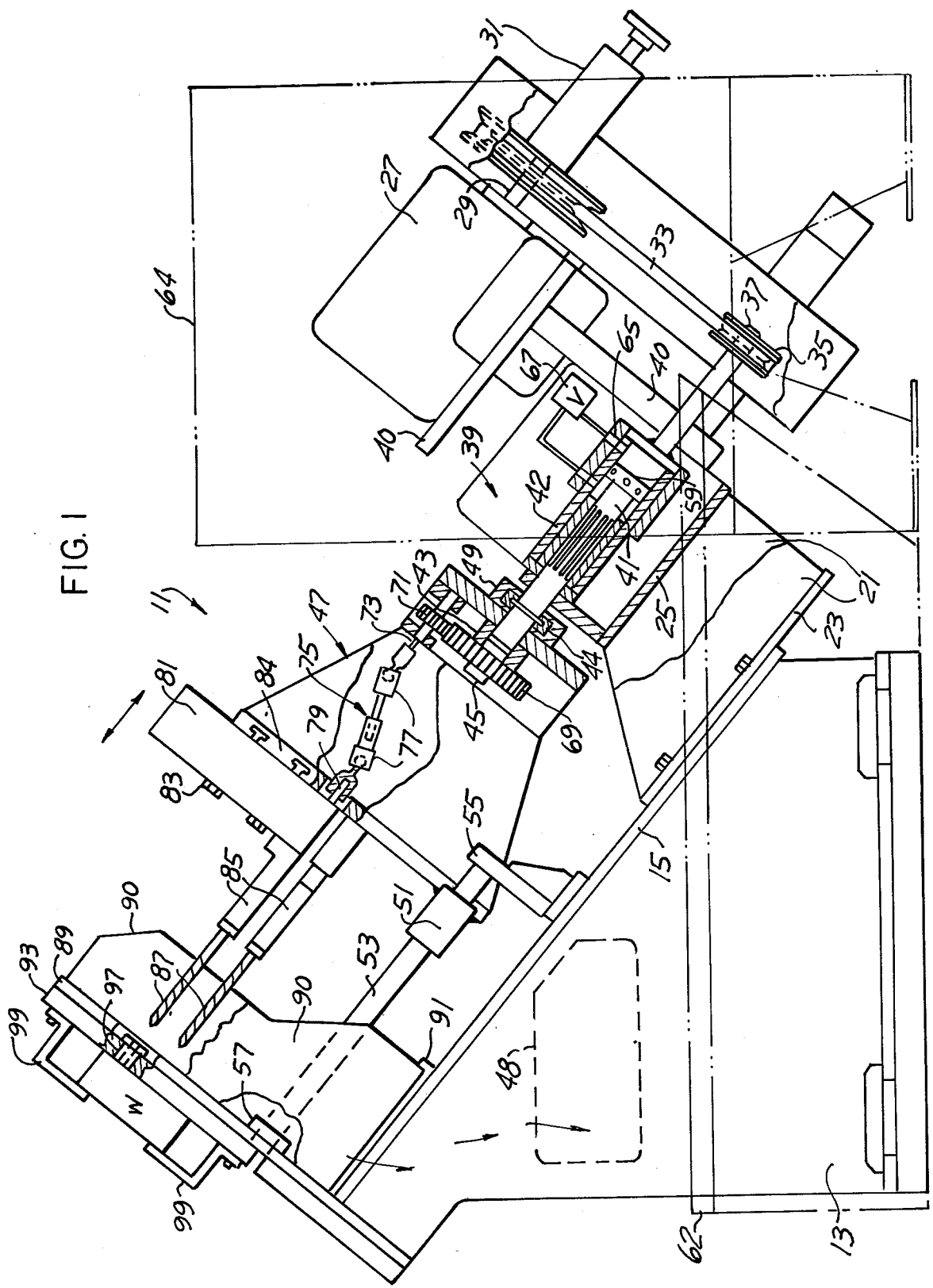
FIG. 1 is a side elevational view of a 12" diameter, 12 spindle inclined drilling machine.

It will be understood that the above drawings illustrate merely preferred embodiments of the invention, and that other embodiments are conptemplated within the scope of the Claims hereafter set forth.

Heretofore, efforts have been made drilling at an angle other than in an upright plane. Examples of such efforts are shown in the following United States Patents:

| | |
|---|---|
| 1,891,721 | 2,395,518 |
| 1,888,566 | 2,429,938 |
| 2,086,583 | 2,795,978 |
| 2,108,823 | 2,953,069 |
| 2,181,873 | 2,963,725 |
| 2,193,840 | 3,049,989 |

DETAILED DESCRIPTION OF THE INVENTION

Referring to FIGS. 1,2, a 12 inches diameter, 12 spindle inclined drilling machine is generally indicated at 11 as including a base 13, a bed 15 inclined at an acute angle to the horizontal in the range of 20° to 40° approximately. In the illustrative embodiment, the bed is inclined at a approximate angle of 40°. A self-contained hydraulic feed drill unit is mounted upon the bed adjacent its lower end. The drill unit 39 has a rotative similarly inclined output shaft 41 adapted for longitudinal reciprocal movements.

A pair of upright spaced mount plates 21 at their lower ends are secured as by brackets 23 to said bed. Platform 25 spans said plates and mounts thereon drill unit 39. Said unit by bracket 40 mounts motor 27 which, in the illustrative embodiment, operates at 1800 RPM., approximately.

Its shaft 29 mounts vari speed drive pulley 31 over which extends the drive belt 33 in driving engagement with driven pulley 35 upon drive shaft 37 of drill unit 39.

Said drill unit has a base 21-23-25 which is mounted upon and secured to bed 15 adjacent the rear end thereof directly below said motor. Said drill unit has an output shaft 41 which is of a telescoping construction and is in driven engagement with a corresponding power driven internally splined cylinder 42, connected to rotative drive shaft 37.

Coupling 43 connects output shaft 41 with the drive shaft 45 which extends into the conventional multiple spindle head 47.

Said head overlies the bed and projects forwardly of the forward end of drill unit 39 which at its rear has a mounting plate 49 apertured to receive shaft 41.

Said shaft mounts a thrust bearing 44 supportably, rotatively nested and retained within plate 49.

Apertured bosses 51 adjacent the forward end portion of the multiple spindle head 47 receive the opposed laterally spaced pair of guide rods 53. These rods at their rear end portions are anchored upon the brackets 55 upon said bed and forward ends of said rods project into the anchor sleeves 57 on fixture mounting plate 89.

Hydraulic piston 59 is reciprocably nested within cylinder 42 and connected to shaft 41. The cylinder includes spaced fittings 65 connected by suitable conduits to the four-way valve 67 which is of the solenoid-control type. In a conventional manner, pressure fluid is delivered to the valve 67 for delivery by suitable conduits to opposite sides of the piston 59 under remote control for regulating longitudinal reciprocal movements of the piston and spindle head 47.

Rotatable cylinder 42 is internally splined and slidably receives splined shaft 41.

While the multiple spindle head is of reasonably conventional construction, it includes a suitable gear 69 keyed to drive shaft 45, and in mesh with a series of pinions 71 suitably journalled within said head and including a corresponding series of axially disposed forwardly extending driver shafts 73. Idler gears may be employed if needed.

Mounted within the multiple spindle head are a series of spindle driver assemblies 75, one of which is shown for illustration as including a shaft and a telescoping tube in drive relation connected at one end by the universal joint 77 to the driver shaft 73, and at its other end is connected by a second universal joint 77 to the spindle 79 which mounts a drilling tool 87.

Depending upon how many holes are to be drilled, there are a corresponding series of adjustable bushing support arms 81 and spindle assemblies mounted upon the forward end of the multiple spindle head 47.

The universally adjustable bushing support arm 81, of which there will be a number corresponding to the number of spindle assemblies, is mounted upon the front face of the multiple spindle head employing a series of fasteners 83 which interlock with a plurality of undercut T slots on the front face of said spindle head. Each arm includes at the inner end thereof a forwardly extending right-angularly related guide bushing 85 adapted to guidably receive the corresponding power-driven spindle 79.

As is conventional in construction, normally mounted upon the front face of the multiple spindle driver assembly are a series of such adjustable bushing support arms 81 adjustably secured so as to properly position the corresponding spindles and associated tool 87 for a predetermined drilling pattern with respect to the workpiece W. Said tool may be a drill, a reamer or a tap.

A pair of spaced fixture adapter plates 90 are mounted upon said bed adjacent its upper end and lie in a plane at right angles to said bed and are secured in position by the inclined mounting plate 91.

The upwardly and rearwardly inclined fixture mount plate 89 is supported on and secured at its ends to plates 90. Plate 89 is used to mount the corresponding anchor sleeves 57 receiving and supporting the forward ends of guide rods 53, FIG. 1.

A series of prelocated bushings 97 are nested within the fixture 93 depending upon the location of the apertures to be drilled in the workpiece W. The workpiece W overlies the forward surface of the fixture and is retained in position by suitable stops and adjustable hold down clamps 99. These may be manual or pneumatic, and are of a conventional construction.

OPERATION

In operation, with the motor 27 operating at full speed, through the power train 29,31,33,35,37,41,42,43,45,69,71,73, the individual spindle assemblies disposed within and mounted adjustably upon the multiple spindle head are drivingly rotated at a uniform speed, each carrying a corresponding drill 87, reamer or tap.

By proper actuation of the remote control for the valve 67, the hydraulic piston 59 is activated hydraulically for effecting the longitudinal inward feed movement of the shaft 41 and the multiple spindle head 47 and connected drills 87.

The forward edge portions of the head are guidably mounted at 51 upon the guide and support rods 53 as the rotating tools are projected forwardly moving through the prelocated bushings 97 and operatively into workpiece W from the underside thereof.

By this arrangement, drilling occurs from the underside of the workpiece so that there is a free falling of chips for easy removal thereof. This has the advantage of reducing heating and friction and in speeding up the drilling time and operation of the drilling mechanism at higher than conventional speeds.

By utilizing the inclined bed 15 and the corresponding fixture adapter plate 89 arranged at a 90° angle with respect to said bed, the fixture 93 and the workpiece W mounted thereon lie upon the front face of said fixture and extend upwardly and rearwardly in such a manner as to facilitate mounting of the workpiece upon the fixture and its proper location thereon.

As can be seen, it takes less time to load a workpiece since the loading thereof is free of the spindles and tools and remote therefrom as shown in FIG. 1. This also provides for greater accuracy of hole location as required by the specific workpiece. Due to the close proximity of the workpiece to the drill bushings. This arrangement also eliminates approach time from the majority of time cycles.

The reciprocal stroke of the multiple spindle head is indicated in FIG. 1, under the control of the drill unit 39 with suitable feed remote controls for valve 67.

Chips fall by gravity into chip collector 48, chute 60, and chip receiver box 62, FIG. 2. Electric control panel is shown at 64.

MODIFICATION

A 18 inches × 48 inches 45 spindle inclined drill machine is shown in FIG. 3, which is essentially a similar machine but handling greater loads and providing greater thrusts, particularly useful for larger drilling jobs.

Without a repetition of the description of the multiple spindle inclined drilling machine already described with respect to FIG. 1, there has been applied to FIG. 3 corresponding numerals to which 100 has been added to the corresponding numeral of FIG. 1 and, accordingly, the description of the tool shown in FIG. 3 is not repeated in full detail.

For example, the base is defined by the numeral 113 with the corresponding angularly inclined bed 115 with ways 117, etc.

Though not shown in detail in FIG. 3, mounted upon the ways 117 upon the acute angled bed 115, there is provided a power reciprocated slide 119. Upon this slide there is mounted the multiple spindle head 147. Hydraulic cylinder 17 is mounted upon bed 115 between ways 117. Its reciprocal piston rod 19 is secured to slide 119.

The multiple spindle head 147, corresponding to the multiple spindle head 47 of FIG. 1 is connected to and is adapted for reciprocal movements with its supporting slide so as to move in a path corresponding to the acute angle of ways 117 and for movement towards and away from the apertured fixture adapter plate 189.

Said adaptor plate corresponding to the fixture adapter 89 of FIG. 1 is mounted upon and secured to said bed and lies in a plane at right angles to bed 115.

Upon the front face of the hollow multiple spindle head 147 there are provided across the top and the bottom and along side portions thereof the pairs of parallel T slots 184.

A plurality of adjustable bushing support arms 181 are longitudinally slotted at 182 and receive the fasteners 183 for securing the corresponding bushing support arm 181 in any predetermined position and location for locating the corresponding transverse bushing 185 so as to guidably receive the spindle assemblies 179 and their connected drills 187, reamers or taps.

While only one adjustable bushing support arm is shown at 81 in FIG. 1, a plurality of such adjustable bushing support arms 181 are shown in FIG. 3.

In FIG. 3, the individual bushing support arms 181 may be variably located as desired for a particular drilling pattern for the drills 187 according to the requirements for a particular drilling job.

The front face 194 of the fixture adapter plate 189 is inclined upwardly and rearwardly and is adapted to receive and have removably mounted thereover the fixture mounting plate 193 employing a series of fasteners 192.

Mounted upon the fixture mounting plate 193 are a plurality of fixtures 195 within which guide bushings 197 are variably located as desired for the particular job. Said fixtures are suitably secured by fasteners and dowels not shown. The workpiece W overlies the corresponding fixture 195 and is secured thereto by the adjustable clamps 199, manually or power operated.

In either machine as shown in FIG. 3, it may be advantageous to provide a coolant during the drilling operation. For this purpose, there is provided a coolant pipe 196 having an inlet fitting 198 for receiving coolant under pressure. Said pipe extends to the upper portion of the fixture adapter plate 189 and terminates in the elongated distributor pipe 200 having a series of lubricant fluid outlets 202.

Since drilling occurs at an acute angle to the workpiece which is inclined upwardly and rearwardly, the chips from the drilling and cutting normally fall by gravity away from the workpiece for a cooler drilling operation and the accumulated chips may be removed from the laterally arranged chute 204 upon one side of the machine base.

The same adavantages above pointed out with respect to the embodiment shown in FIG. 1 would equally apply to the heavy-duty embodiment in FIG. 3. There is less heating of the drillings due to the gravity fall of the chips resulting in longer life of the drilling tools 187.

The arrangement with the exterior mounting of the workpiece W upon the fixtures 195 facilitate such mounting and set up with much less time expended. Drilling time is cut down and the machine can operate at higher speeds and feeds due to this arrangement.

The remote controls for the operation of the multiple spindle inclined drill machine are conventional and the detail of the structure and operation thereof are omitted herein.

Additional machine sizes not shown at present include:
 (1) 9¾ inches Diameter-10 spindle;
 (2) 12 inches × 24 inches -16 spindle;
 (3) 15 inches × 45 inches -32 spindle;
 (4) Inclined two station drilling and taping machine 18 inches × 48 inches -22 spindle tap 23 spindle drill.

Spaced mounting plates 121 are anchored by bracket 123 upon slide 119, FIG. 3. Platform 125 spanning plates 121 supports motor 127. The timing belt 133 provides rotative power and drive to the drill unit 139. Said unit transmits rotative drive in a conventional manner to the multiple spindle head 147.

For the heavy duty inclined drill machine of FIG. 3, half of the tools 187 may be drills and half may be taps. This means that drilling and tapping of different workpieces may go on at the same time. On one fixture 195 is mounted a work piece W to be drilled. Upon another fixture 195 is mounted another workpiece, already drilled, and ready for tapping. Alternately, the tapping tools may be replaced by reamers so that there can be simultaneous drilling and reaming or simultaneous reaming and tapping of workpieces. The same advantages described for angle drilling apply to angular reaming and tapping.

Having described my invention, reference should now be had to the following Claims.

I claim:

1. In a multiple spindle inclined drilling machine;
 a base;
 a bed on said base inclined at an acute angle to the horizontal in the range of 20° to 40°, approximately;
 a drill unit mounted upon said bed, said drill unit including:
 an internally splined cylinder rotatively journaled within the drill unit and inclined at a corresponding acute angle;
 a piston rod with a splined connection to said cylinder projecting therefrom for effecting controlled reciprocal movements;
 a multiple spindle head spaced above and slidably mounted on said bed and projecting forwardly of said drill unit and connected to said piston rod for reciprocal movements therewith;
 an upwardly and rearwardly inclined fixture mount plate secured upon said bed lying in a plane at right angles thereto facing said head;
 spaced parallel guide support rods above, parallel to and secured at one end to said bed with the other end of each rod secured to said mount plate;
 apertured support means on and adjacent the forward end of said multiple spindle head, slidably and guidably mounted upon said rods;
 a rotative drive means on said drill unit having a variable speed output shaft connected to said cylinder for rotating its piston rod;
 and a plurality of drive spindles with individually mounted drills adjustably supported upon and within said head and connected to and rotated by said piston rod.

2. In the multiple spindle drilling machine of claim 1, said angle being 40 degrees, approximately.

3. In the multiple spindle drilling machine of claim 1, a pair of spaced adapter plates mounted on said bed; said fixture mount plate spanning and secured to said adapter plates; a workpiece supporting fixture mounted on and secured to said fixture mount plate; a series of variably located drill guide bushings nested within said fixture arranged in a predetermined pattern for receiving a plurality of prelocated spindle assemblies and drills upon said head; and clamping means adjustably mounted upon said fixture adapted for receiving, locating and securing upon the exterior thereof a workpiece to be drilled, reamed or tapped.

4. In the multiple spindle drilling machine of claim 1, a pair of upright motor mount plates secured to said bed; a platform spanning and secured to said plates and inclined at an acute angle corresponding to said bed; said drill unit being mounted on said platform; said rotative drive means including a motor and a drive shaft mounted upon said drill unit; a multiple speed drive pulley on said motor drive shaft; and a drive shaft connected to said drive pulley and to said cylinder for rotating said cylinder.

5. In the multiple spindle drilling machine of claim 4, said piston rod having a telescoping drive connection with said cylinder for transmitting rotative power during longitudinal adjustment thereof to the connected multiple spindle head.

6. In the multiple spindle drilling machine of claim 1, the upward drilling into said workpiece providing a gravity free fall of chips, thereby reducing heat factors for increased tool life, the exterior mounting of the workpiece upon said fixture facilitating loading and unloading of workpieces as well as eliminating approach time, both reducing drill time, tool life also being increased because there is no redrilling of chips that clog up a hole as in conventional drilling.

7. In a multiple spindle inclined drilling machine;
a base;
a bed on said base inclined at an acute angle to the horizontal in the range of 30° to 40° approximately;
guideways on said bed;
a slide spanning and guidably mounted upon said guideways;
a hydraulic cylinder assembly mounted upon said bed between said ways with its piston rod connected to said slide for effecting controlled reciprocal movements thereof;
a multiple spindle head mounted upon said slide and projecting forwardly thereof;
an apertured fixture adapter mounted upon said bed lying in a plane at right angles thereto and having an apertured upwardly and rearwardly inclined front face;
an upwardly and rearwardly inclined fixture mount plate spanning and overlying and secured to the front face of said adapter plate;
a power rotative drive means on said slide;
and a plurality of drive spindles with individually mounted drills, reamers, or taps adjustably supported upon and within said head and connected to said drive means.

8. In the multiple spindle drilling machine of claim 7, a fixture mounted on and secured to said fixture mounting plate; a series of variably located drill guide bushings nested within said fixture arranged in a predetermined pattern for receiving a plurality of drills upon a plurality of preadjusted spindle assemblies; and clamping means adjustably mounted upon said fixture adapted for receiving, locating and securing upon the exterior thereof a workpiece to be drilled, reamed or tapped.

9. In the multiple spindle drilling machine of claim 7, said rotative drive means including a pair of upright motor mount plates secured to said slide; a platform spanning and secured to said plates and inclined at an acute angle corresponding to said bed; a motor mounted on said platform and having an output shaft; a multiple speed control on said slide having a drive shaft connected to said motor output shaft and a variable speed output shaft connected to said drive shaft projecting into and drivingly engaging said multiple spindle head.

10. In the multiple spindle drilling machine of claim 9, the variable speed output shaft transmitting rotative power during longitudinal adjustment of said slide and connected multiple spindle head.

11. In the multiple spindle drilling machine of claim 7, the upward drilling into said workpiece providing a gravity free fall of chips, thereby reducing heat factors for increased tool life, the exterior mounting of the workpiece upon said fixture facilitating loading and unloading of workpieces as well as eliminating approach time, both reducing drill time, tool life also being increased because there is no redrilling of chips to clog up a hole as in conventional drilling.

12. In the drilling machine of claim 7, some of the drill spindles mounting drills and other spindles mounting taps, whereby drilling of one workpiece and tapping of a predrilled workpiece may be simultaneous.

13. In the drilling machine of claim 7, some of the drive spindles mounting drills and other spindles mounting reamers, whereby drilling of one workpiece and reaming of a previously drilled workpiece is simultaneous.

14. In the drilling machine of claim 7, some of the drive spindles mounting reamers with other spindles mounting taps, whereby reaming of a workpiece and tapping of a previously drilled workpiece are simultaneous.

* * * * *